US012617384B2

(12) United States Patent
Weh et al.

(10) Patent No.: US 12,617,384 B2
(45) Date of Patent: May 5, 2026

(54) HYDRAULIC BLOCK FOR A HYDRAULIC SERVO POWER BRAKE SYSTEM

(71) Applicant: Robert Bosch GmbH, Stuttgart (DE)

(72) Inventors: Andreas Weh, Sulzberg (DE);
Matthias Mayr, Rettenberg (DE);
Stefan Kaserer, Ofterschwang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 717 days.

(21) Appl. No.: 18/067,337

(22) Filed: Dec. 16, 2022

(65) Prior Publication Data

US 2023/0256954 A1    Aug. 17, 2023

(30) Foreign Application Priority Data

Feb. 16, 2022    (DE) ..................... 10 2022 201 571.1

(51) Int. Cl.
*B60T 17/04*        (2006.01)
*F15B 15/20*        (2006.01)
(52) U.S. Cl.
CPC .............. *B60T 17/04* (2013.01); *F15B 15/20* (2013.01)
(58) Field of Classification Search
CPC .......... B60T 17/04; B60T 13/74; B60T 8/368; B60T 13/12; B60T 8/00; B60T 8/34; B60T 8/341; B60T 8/343; B60T 8/344; B60T 13/686; F15B 15/20
See application file for complete search history.

(56) References Cited

U.S. PATENT DOCUMENTS

| | | | | |
|---|---|---|---|---|
| 10,308,232 | B2 * | 6/2019 | Mayr ..................... | B60T 8/368 |
| 2021/0309197 | A1 * | 10/2021 | Weh ........................ | B60T 8/368 |
| 2023/0256953 | A1 * | 8/2023 | Weh ........................ | B60T 17/02 |
| | | | | 137/597 |

FOREIGN PATENT DOCUMENTS

DE        102016202113  A1      8/2017

OTHER PUBLICATIONS

German Patent No. DE 102014219886 to Heyer et al published on Apr. 7, 2016.*
German Patent No. DE 102020202048 to Weh et al published on Aug. 19, 2021.*
WO document No. WO 2022128507 to Tandler et al published on Jun. 23, 2022.*
German Patent No. DE 102021206074 to Weh et al published on Dec. 15, 2022.*

* cited by examiner

*Primary Examiner* — Pamela Rodriguez
(74) *Attorney, Agent, or Firm* — NORTON ROSE FULBRIGHT US LLP

(57)        ABSTRACT

A bore arrangement of a hydraulic block of a hydraulic unit of a pressure control module of a servo power brake system and in particular an arrangement of receptacles for solenoid valves in a valve side of the hydraulic block.

15 Claims, 7 Drawing Sheets

HYDRAULIC BLOCK FOR A HYDRAULIC SERVO POWER BRAKE SYSTEM

CROSS REFERENCE

The present application claims the benefit under 35 U.S.C. § 119 of German Patent Application No. DE 10 2022 201 571.1 filed on Feb. 16, 2022, which is expressly incorporated herein by reference in its entirety.

FIELD

The present invention relates to a cuboidal hydraulic block for a hydraulic unit of a hydraulic servo power brake system.

BACKGROUND INFORMATION

German Patent Application No. DE 10 2016 202 113 A1 describes a narrow, cuboidal hydraulic block for a hydraulic unit of a slip-controlled, hydraulic servo power brake system, in which a brake master cylinder bore is provided continuously from one to an opposite narrow side and a servo power cylinder bore is provided perpendicularly to the brake master cylinder bore likewise continuously through two opposing major sides of the hydraulic block. The conventional hydraulic block moreover has a blind hole as a receptacle for a pedal travel simulator. In order to generate brake pressure using servo power, a servo power piston is displaceable in the servo power cylinder bore with an electric motor by way of a ball-screw drive. The electric motor is arranged coaxially with the servo power cylinder bore externally on one of the two major sides of the hydraulic block and the ball-screw drive is located, likewise coaxially with the electric motor and the servo power cylinder bore, between the electric motor and the servo power piston. The electric motor and the ball-screw drive form a servo power drive and, together with the servo power piston and the servo power cylinder bore, a servo power brake pressure generator for the hydraulic vehicle brake system. In a major side opposite the electric motor, the conventional hydraulic block has receptacles for solenoid valves for brake pressure control.

SUMMARY

The hydraulic block according to the present invention is provided for a hydraulic unit of a hydraulic servo power brake system.

In order to generate hydraulic brake pressure using servo power, the hydraulic block according to the present invention has a servo power cylinder bore which passes through the hydraulic block from one side to an opposite side. These two opposite sides of the hydraulic block are here denoted motor side and valve side. The motor side of the hydraulic block is provided for mounting an electric motor for displacing a servo power cylinder in the servo power cylinder bore, for example by way of a screw mechanism as a rotation/translation conversion mechanism, optionally with interposition of a reducing gear. As a result of the displacement of the servo power cylinder in the servo power cylinder bore, brake fluid is expelled from the servo power cylinder bore and brake pressure generated using servo power.

The motor side and the valve side are preferably mutually opposing major sides of the hydraulic block. The further four sides of the cuboidal hydraulic block all adjoin the motor side and the valve side and are here denoted top side, bottom side, mounting side and a sixth side of the hydraulic block opposite the mounting side.

A brake master cylinder bore opens on the mounting side of the hydraulic block and the present invention provides that the hydraulic block is mounted with the mounting side on a bulkhead of a motor vehicle in such a way that the top side of the hydraulic block is located at the top. The brake master cylinder bore passes through parallel to the bottom side of the hydraulic block below the servo power cylinder bore, i.e., the brake master cylinder bore is located between the servo power cylinder bore and the bottom side of the hydraulic block. The brake master cylinder bore and the servo power cylinder bore extend at right angles to each other.

In the valve side, the hydraulic block according to the present invention has receptacles for solenoid valves and further hydraulic components such as nonreturn valves, hydraulic accumulators, damper chambers and pressure sensors for brake pressure control. Brake pressure control means control of a brake pressure in the vehicle brake system, in brake circuits of the vehicle brake system and/or in hydraulic wheel brakes of the vehicle brake system which are connected to the hydraulic block, control being taken to mean both closed-loop and open-loop control. Brake pressure control may in particular also include slip control. Slip control systems are for example antilock braking, traction control or vehicle dynamics control systems which are commonly known by the abbreviations ABS, TCS and/or VDC. Slip control systems are conventional and are not explained here.

The hydraulic block serves for mechanical mounting and hydraulic interconnection of the hydraulic components of the vehicle brake system, brake pressure generation, brake pressure control and/or slip control. The hydraulic components are mounted in the receptacles in the hydraulic block which mainly take the form of cylindrical indentations, blind holes or through holes, in some cases with stepped diameters. The hydraulic block may also have such receptacles in sides other than the valve side.

"Interconnected" means that the receptacles or the hydraulic components mounted therein are connected by brake fluid lines in the hydraulic block in accordance with a hydraulic circuit diagram of the vehicle brake system. The brake fluid lines are typically not necessarily drilled in the hydraulic block.

In particular, the hydraulic block has a Cartesian bore arrangement, which means that the bores and lines, thus in particular the brake master cylinder bore, the servo power cylinder bore, a simulator cylinder bore, the receptacles for the hydraulic components and the brake fluid lines connecting them are provided in the hydraulic block parallel and at right angles to each other and to the sides and edges of the cuboidal hydraulic block. The present invention does not exclude individual oblique bores. The trough or blind holes in the hydraulic block, here denoted "lines" or "bores" or "cylinder bores", may also be produced other than by drilling.

Once populated with the hydraulic components of the vehicle brake system or its slip control system, the hydraulic block forms the hydraulic unit, "populated" meaning that the hydraulic components are mounted in their respectively intended receptacles in the hydraulic block.

According to an example embodiment of the present invention, the hydraulic block moreover in particular has ports for brake lines which lead to hydraulic wheel brakes of the vehicle brake system. Ports for brake lines which lead to a further hydraulic block or hydraulic unit are also possible.

The present invention is directed to the arrangement of the receptacles of certain solenoid valves of the brake pressure and slip control system of the hydraulic servo power brake system in the valve side of the hydraulic block and the brake fluid lines connecting them in the hydraulic block.

Further developments and advantageous refinements of the present invention are disclosed herein.

All the features disclosed in the description herein and the figures can be implemented in embodiments of the present invention individually by themselves or, in principle, in any desired combination. Embodiments of the present invention which do not include all but rather only one or more features of an embodiment of the present invention are in principle possible.

BRIEF DESCRIPTION OF THE DRAWINGS

The present invention is explained in greater detail below with reference to an embodiment illustrated in the figures.

FIGS. 2 to 7 are simplified and schematic representations for explaining and illustrating the present invention. The hydraulic block is drawn transparent to reveal its bore arrangement.

FIGS. 4 to 7 show only part of the bore arrangement of the hydraulic block for reasons of clarity and intelligibility.

DETAILED DESCRIPTION OF EXAMPLE EMBODIMENTS

Figure 1:
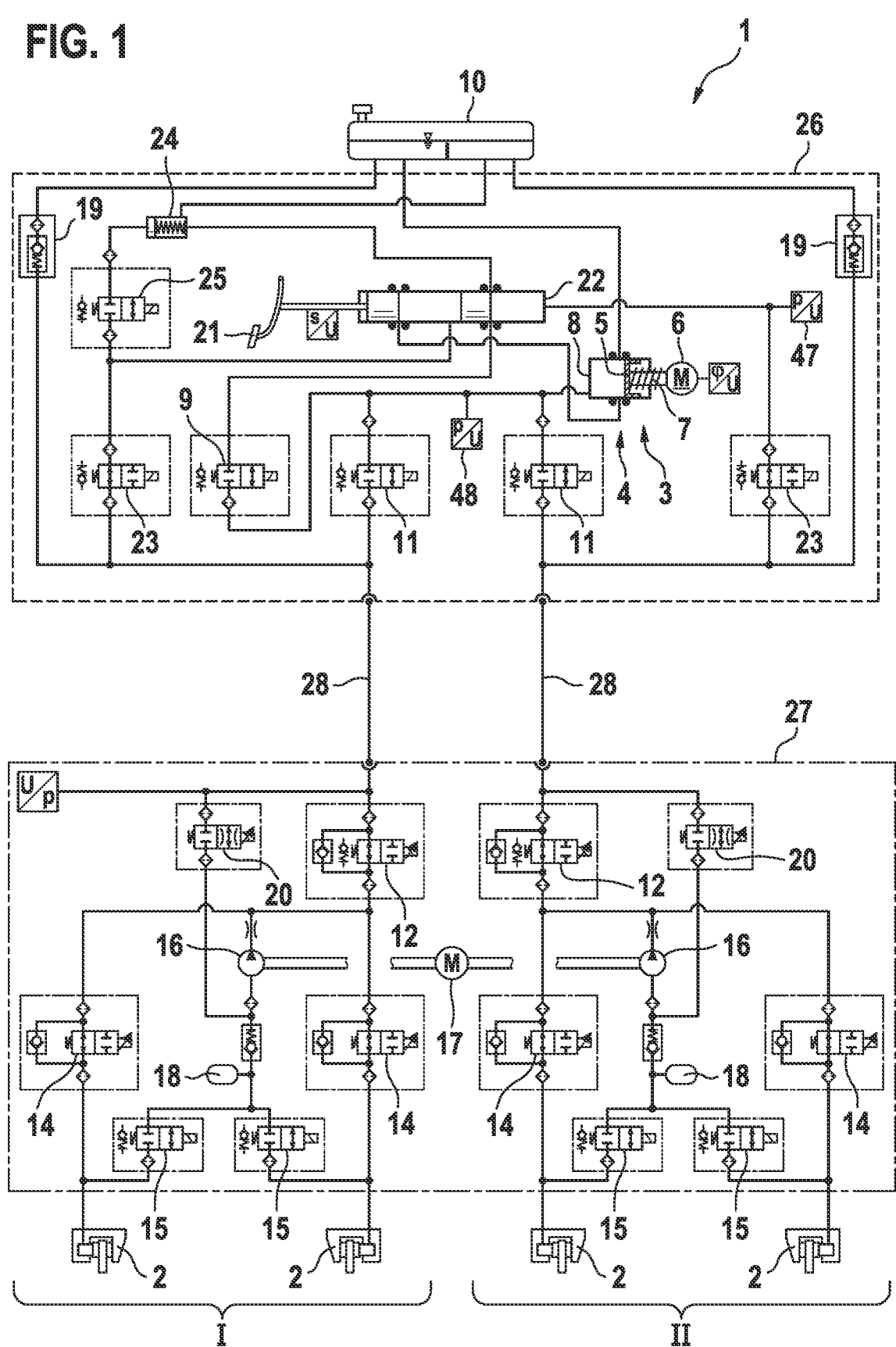
FIG. 1 is a hydraulic circuit diagram of a servo power brake system, according to an example embodiment of the present invention.

The vehicle brake system 1 shown in FIG. 1 is intended for a passenger car with four hydraulic wheel brakes 2 and is embodied as a dual-circuit brake system with two hydraulic wheel brakes 2 in each brake circuit I, II. Other embodiments are possible, for example a single-circuit brake system or a multi-circuit brake system with more than two brake circuits I, II and/or another number of wheel brakes 2 and/or a different assignment of the wheel brakes 2 to the brake circuits I, II.

The vehicle brake system 1 has an electrohydraulic servo power brake pressure generator 3 with a piston-cylinder unit 4, the piston 5 of which is axially displaceable in a cylinder 8 using an electric motor 6 in order to generate brake pressure by way of a screw drive 7 or another rotation/translation conversion mechanism. The piston-cylinder unit 4 may also be referred to as a plunger unit and the piston 5 as a plunger piston. The cylinder 8 of the piston-cylinder unit 4 of the servo power brake pressure generator 3 is connected to a pressureless brake fluid reservoir 10.

The wheel brakes 2 are connected via valves, here denoted servo power valves 11, first isolation valves 12 and inlet valves 14 to the servo power brake pressure generator 3, more precisely to the cylinder 8 of the piston-cylinder unit 4 of the servo power brake pressure generator 3. For the purposes of distribution into the brake circuits I, II, two servo power valves 11 are arranged hydraulically in parallel, two first isolation valves 12 hydraulically likewise in parallel and in each case one servo power valve 11 and a first isolation valve 12 hydraulically in series.

The wheel brakes 2 are connected via the inlet valves 14 to the first isolation valves 12, specifically, in each brake circuit I, II, two wheel brakes 2 are jointly connected with in each case one inlet valve 14 to a first isolation valve 12. The wheel brakes 2 are connected via outlet valves 15 to suction sides of hydraulic pumps 16 which are drivable with a common electric motor 17. For each brake circuit I, II, there is a hydraulic pump 16, to the suction side of which are connected the wheel brakes 2 of the respective brake circuit I, II via the outlet valves 15.

Between the outlet valves 15 and the hydraulic pumps 16, hydraulic accumulators 18 are connected to the suction sides of the hydraulic pumps 16 for interim storage of brake fluid which flows out of the wheel brakes 2 when the outlet valves 15 are opened during brake pressure control and/or slip control.

The inlet valves 14 and outlet valves 15 form brake pressure control arrangements with which wheel brake pressures can be individually controlled in each wheel brake 2. In conjunction with the hydraulic pumps 16, slip control systems, in particular antilock braking, traction control and/or vehicle dynamics control systems, are possible. These slip control systems are commonly known by the abbreviations ABS, TCS and/or VDC. Vehicle dynamics control systems are also colloquially known as antiskid control systems. Such slip control systems are conventional and are not explained here.

In addition, the suction sides of the hydraulic pumps 16 are each connected by a nonreturn valve 19 and an intake valve 20 to the brake fluid reservoir 10, such that the hydraulic pumps 16 can draw brake fluid from the brake fluid reservoir 10 in order to generate or increase brake pressure. The nonreturn valves 19 permit flow from the direction of the brake fluid reservoir 10 toward the intake valves 20 and the hydraulic pumps 16.

The vehicle brake system 1 has a dual-circuit brake master cylinder 22 actuatable by muscle power with a brake pedal 21, to which master cylinder the wheel brakes 2 in each brake circuit I, II are each connected via a second isolation valve 23, the first isolation valves 12 and the inlet valves 14, such that the vehicle brake system 1 is also actuatable with muscle power. The second isolation valves 23, the first isolation valves 12 and the inlet valves 14 are arranged hydraulically in series.

In principle, the vehicle brake system 1 is actuated by servo power, brake pressure being generated with the electrohydraulic servo power brake pressure generator 3. In the event of a malfunction or failure of the electrohydraulic servo power brake pressure generator 3, brake pressure can be generated with the hydraulic pumps 16 of the slip control or alternatively with the brake master cylinder 22. The brake master cylinder 22 itself serves as a setpoint encoder for the wheel brake pressures to be established in the wheel brakes 2 in the case of the electrohydraulic servo power brake pressure generator 3 being operational.

In one of the two brake circuits I, a pedal travel simulator 24 is connected via a simulator valve 25 to the brake master cylinder 22. The pedal travel simulator 24 is a spring-loaded hydraulic accumulator, into which, when the simulator valve 25 is open, brake fluid can be expelled from the brake master cylinder 22, such that in a servo power brake system in which the second isolation valves 23 are closed, a piston is displaceable in the brake master cylinder 22 and the brake pedal 21 is movable in order to provide the vehicle driver with a familiar pedal feel.

The cylinder 8 of the servo power brake pressure generator 3 is connected to the brake fluid reservoir 10 by a drain valve 9 and a groove extending around the brake master cylinder 22. Opening the drain valve 9 allows overpressure in the servo power brake system 1 to be relieved and brake fluid to be drained into the pressureless brake fluid reservoir 10. The overpressure may be due to temperature fluctuations and, during slip control, the hydraulic pumps 16 may have drawn in brake fluid from the brake fluid reservoir 10 through the nonreturn valves 19 and the intake valves 20 which are to be opened in this case, which brake fluid can be drained back into the brake fluid reservoir 10 through the drain valve 9.

In the described and depicted embodiment of the servo power brake system 1, the first isolation valves 12, the inlet valves 14 and the second isolation valves 23 are 2/2-way solenoid valves which are open in their deenergized basic positions, and the drain valve 9, the servo power valves 11, the outlet valves 15, the intake valves 20 and the simulator valve 25 are 2/2-way solenoid valves which are closed in their deenergized basic positions.

The servo power brake pressure generator 3, the brake master cylinder 22, the pedal travel simulator 24, the simulator valve 25, the nonreturn valves 19, the servo power valves 11 and the second isolation valves 23 are combined into a first module, here denoted pressure generation module 26, and the electric motor 17 with the hydraulic pumps 16, the first isolation valves 12, the intake valves 20, the inlet valves 14 and the outlet valves 15 are combined into a second module, here denoted pressure control module 27. The pressure control module 27 is connected in each brake circuit I, II via a brake line 28 to the pressure generation module 26 and the wheel brakes 2 are connected via brake lines to the pressure control module 27. Embodiments of the servo power brake system 1 in which all the hydraulic components are accommodated in one module are also possible (not shown).

Figure 2:
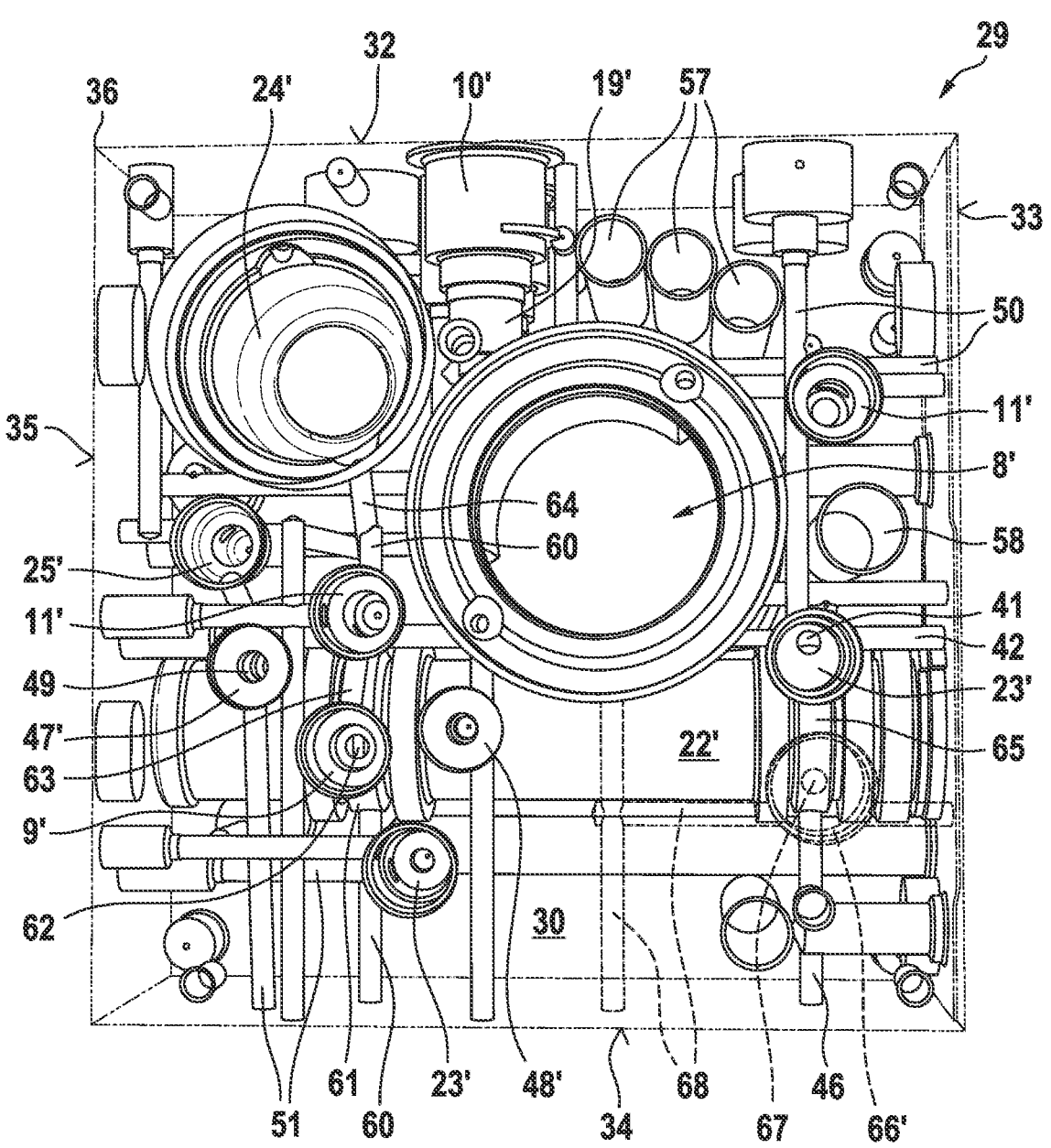
FIG. 2 shows a hydraulic block for a hydraulic unit of the servo power brake system from FIG. 1 viewed toward a valve side of the hydraulic block, according to an example embodiment of the present invention.
Figure 3:
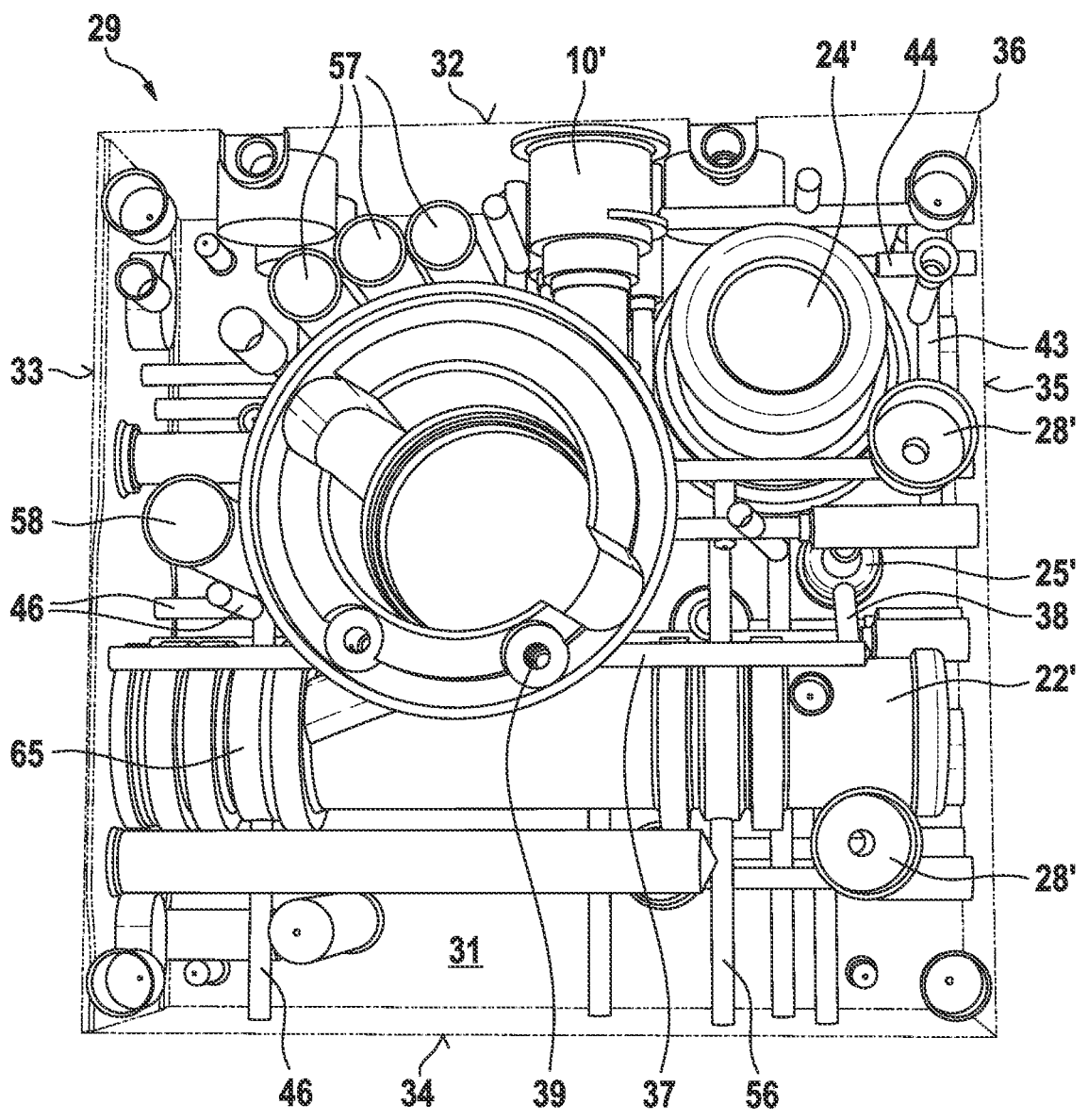
FIG. 3 shows the hydraulic block from FIG. 2 viewed toward an opposite motor side of the hydraulic block, according to an example embodiment of the present invention.

In the exemplary embodiment of the present invention, the pressure generation module 26 has a hydraulic block 29 shown in FIGS. 2 to 6, on and in which the hydraulic components of the pressure generation module 26 are arranged, mounted and hydraulically interconnected. Once populated with the hydraulic components, the hydraulic block 29 forms a hydraulic unit of the pressure generation module 26 of the servo power brake system 1. In the exemplary embodiment, the hydraulic block 29 is a shallow, cuboidal metal block. "Shallow" means that the hydraulic block 29 is roughly three to four times as wide or long as it is thick. In the exemplary embodiment, two opposing major sides of the hydraulic block 29 are virtually square and form a valve side 30 (FIG. 2) and a motor side 31 (FIG. 3). The further four sides of the hydraulic block 29 are hereinafter denoted top side 32 (FIG. 4), mounting side 33 (FIG. 5), bottom side 34 (FIG. 6) and a sixth side 35 opposite the mounting side 33. In the drawings, the hydraulic block 29 is shown unpopulated, i.e. without the hydraulic components.

The brake fluid reservoir 10 (not shown in FIGS. 2 to 6) is arranged on the top side 32 of the hydraulic block 29. In the top side 32, the hydraulic block 29 has two indentations as ports 10' for the brake fluid reservoir 10, in which are inserted connecting nipples which protrude from the bottom of the brake fluid reservoir 10 when the brake fluid reservoir 10 is arranged on the top side 32 of the hydraulic block 29. The connecting nipples of the brake fluid reservoir 10 are sealed in the ports 10' with O-rings or in another manner. The two ports 10' are arranged side by side, i.e. arranged one behind the other in the top side 32 of the hydraulic block 29 when viewed perpendicularly onto the valve side 30 or onto the motor side 31. The ports 10' are arranged in the hydraulic block 29 between a motor power bore 57 and the simulator cylinder bore 24'. They are located on a side facing the sixth side 35 centrally between the mounting side 33 and the sixth side 35 opposite thereto. Axes of the ports 10' for the brake fluid reservoir 10 extend roughly tangentially to the servo power cylinder bore 8'.

The top side 32 is located at the top in an intended installation and service position of the hydraulic block 29. The mounting side 33 adjoins the top side 32 and is used for mounting the hydraulic block 29 on a bulkhead of a motor vehicle (not shown). A brake master cylinder bore 22' which forms the brake master cylinder 22 opens on the mounting side 33 and extends centrally through the hydraulic block 29 between the valve side 30 and the motor side 31 parallel to the top side 32 and to the bottom side 34 opposite the top side 32. The brake master cylinder bore 22' is closed on a side opposite its opening on the mounting side 33. The brake master cylinder bore 22' is located below the center between the top side 32 and the bottom side 34 of the hydraulic block 29.

A servo power cylinder bore 8' which forms the cylinder 8 of the servo power brake pressure generator 3, is provided perpendicular to the brake master cylinder bore 22' continuously from the valve side 30 to the motor side 31 in the hydraulic block 29. On the valve side 30, the servo power cylinder bore 8' is extended and closed by a cylindrically tubular dome (not shown) which is closed at one end. The servo power cylinder bore 8' is located between the brake master cylinder bore 22' and the top side 32 of the hydraulic block 29 and passes perpendicularly close by the brake master cylinder bore 22'. It is arranged somewhat off-center toward the mounting side 33 of the hydraulic block 29. One axis of the servo power cylinder bore 22 is located above the center between the top side 32 and the bottom side 34 of the hydraulic block 29, a horizontal center plane (not shown) of the hydraulic block 29 which is parallel to the top side 32 and the bottom side 34 of the hydraulic block 29 intersecting the servo power cylinder bore 8' in an imaginary secant plane of the servo power cylinder bore 8'.

The electric motor 6 of the servo power brake pressure generator 3, which is not shown in FIGS. 2 to 6, is arranged coaxially with the servo power cylinder bore 8' externally on the motor side 31 of the hydraulic block 29. A planetary gear set as reducing gear and the screw mechanism 7, which in the exemplary embodiment is a ball-screw drive, are arranged coaxially with the servo power cylinder bore 8' between the electric motor 6 and the piston 5 of the servo power brake pressure generator 3 (not shown in FIGS. 2 to 6).

A simulator cylinder bore 24' of the pedal travel simulator 24 is provided in the valve side 30 of the hydraulic block 29 parallel to the servo power cylinder bore 8' and perpendicular to the brake master cylinder bore 22'. In the exemplary embodiment, the simulator cylinder bore 24' is provided between the servo power cylinder bore 8' and an edge 36 of the hydraulic block 29 at the transition from the top side 32 to the sixth side 35 of the hydraulic block 29 opposite the mounting side 33. The simulator cylinder bore 24' is closed on the motor side 31.

Receptacles 9', 11', 23', 25' for the solenoid valves, namely the drain valve 9, the servo power valves 11, the second isolation valves 23 and the simulator valve 25 (the other solenoid valves are accommodated in the pressure control module 27) and receptacles 47', 48' for further components such as pressure sensors 47, 48 are provided in the valve side 30 of the hydraulic block 29. Receptacles 9', 11', 23', 25', 47', 48', which in FIGS. 2 to 6 are denoted by the reference numeral of the respective solenoid valve 9, 11, 23, 25 or other component 47, 48 with an appended "'", are cylindrical indentations, in some cases with stepped diameters, or blind holes in the hydraulic block 29. The hydraulic components are inserted into the receptacles and peripherally caulked to make them pressure-tight. Hydraulic portions of the solenoid valves 9, 11, 23, 25 which form the actual valves are accommodated in the receptacles, while armatures and magnet coils, which are accommodated in a valve dome, project perpendicularly from the valve side 30 of the hydraulic block 29.

Three motor power bores 57 extending from the valve side 30 to the motor side 31 are provided in the hydraulic block 29 on an imaginary arc around the servo power cylinder bore 8'. One of the three motor power bores 57 is arranged above the servo power cylinder bore 8', i.e. between the servo power cylinder bore 8' and the top side 32 of the hydraulic block 29. The two further motor power bores 57 follow on the imaginary circular arc around the servo power cylinder bore 8' toward the mounting side 33 of the hydraulic block 29. The motor power bores 57 are used to feed through power cables for current feed to the electric motor 6 of servo power brake pressure generator 3.

The hydraulic block 29 further has a signal line bore 58 which likewise extends from the valve side 30 to the motor side 31. The signal line bore 58 is located between the servo power cylinder bore 8' and the mounting side 33 of the hydraulic block 29. Signal lines for open- or closed-loop control of the electric motor 6 of the servo power brake pressure generator 3 are passed therethrough from an electronic control unit (not shown), which is provided on the valve side 30 of the hydraulic block 29, to the electric motor 6 on the motor side 31 of the hydraulic block 29.

The hydraulic block 29 of the hydraulic unit of the servo power brake system 1 has a bore arrangement in accordance with the hydraulic circuit diagram shown in FIG. 1. "Bore arrangement" is taken to mean the cylinder bores, receptacles for the solenoid valves and ports provided in the hydraulic block 29 together with bores connecting them in accordance with the hydraulic circuit diagram and forming brake fluid lines. The hydraulic block 29 has a Cartesian bore arrangement, i.e. the bores, receptacles, ports, lines etc. are provided in the hydraulic block 29 parallel and perpendicular to each other and to sides and edges of hydraulic block 29. This does not preclude individual, obliquely extending lines and bores. The bore arrangement of the hydraulic block 29 is in part drawn with dashed lines in FIGS. 2 to 6.

The receptacles 11' for the two servo power valves 11 are provided in the valve side 30 of the hydraulic block 29 diametrically opposite each other with respect to the servo power cylinder bore 8' with their axes on an imaginary axial plane of the servo power cylinder bore 8'. This axial plane extends obliquely at an acute angle—in the exemplary embodiment of about 40°—to the top side 32 and the bottom side 34 of the hydraulic block 29. The axes of the receptacles 11' for the two servo power valves 11 are located in imaginary tangential planes of the servo power cylinder bore 8' which are parallel to the top side 32 and the bottom side 34 of the hydraulic block, which planes contact the servo power cylinder bore 8' above and below, i.e. respectively on the top side 32 and the bottom side 34 of the hydraulic block 29.

Figure 7:
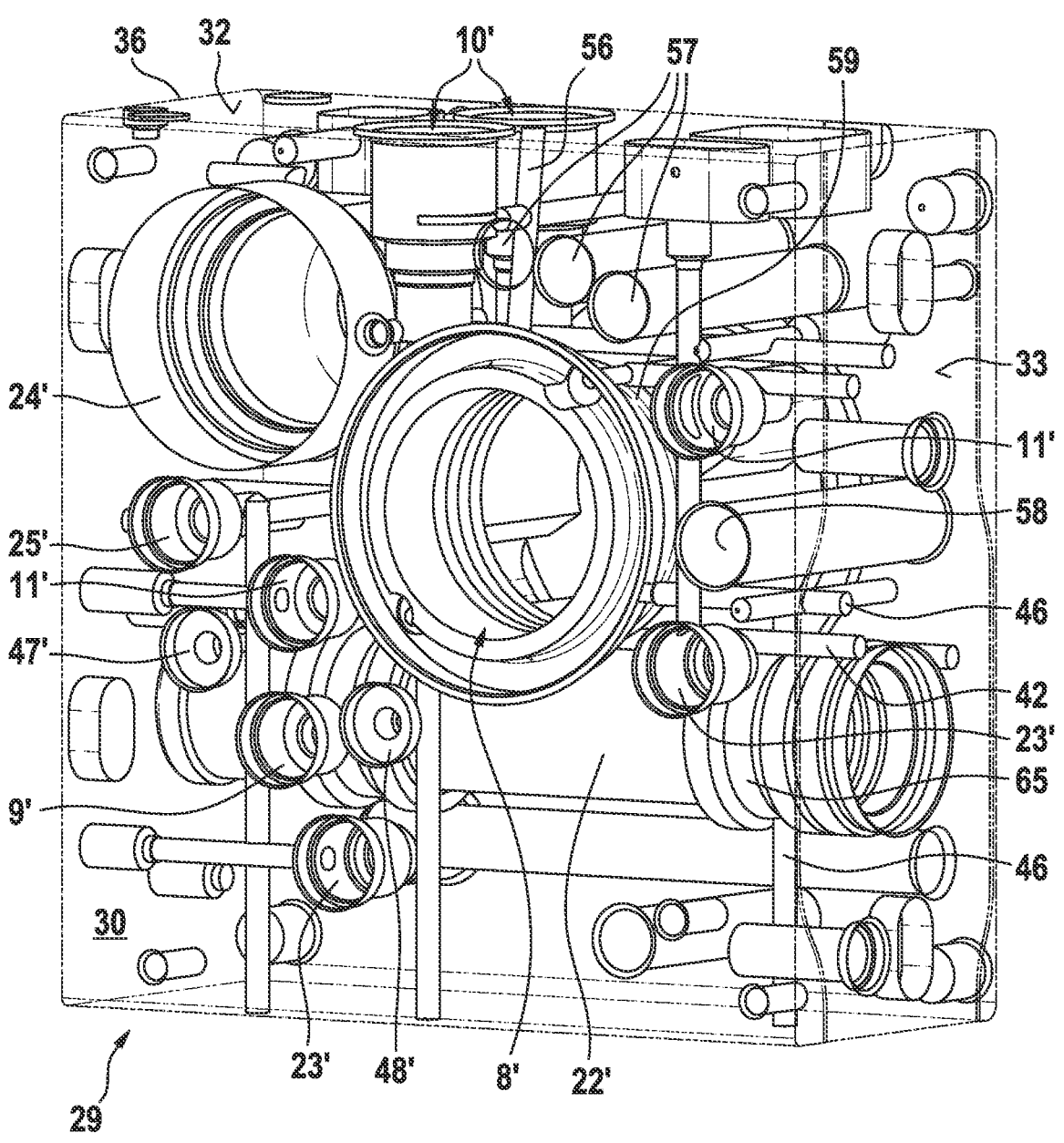

A multiply bent sixth brake fluid line 56 connects the brake master cylinder bore 22' with one of the two ports 10' for the brake fluid reservoir 10 (FIG. 7): Originating from the bottom side 34 of the hydraulic block 29, the sixth brake fluid line 56 radially crosses the groove 65 surrounding the brake master cylinder bore 22' and, after a bend above the receptacle 23' for one of the two second isolation valves 23, opens from the direction of the mounting side 33 into a groove 59 surrounding the servo power cylinder bore 8'. At the top of the groove 59, the sixth brake fluid line 56 leads out further upward toward the top side 32 of the hydraulic block 29 and, after a bend, opens into one of the two ports 10' for the brake fluid reservoir 10.

The receptacle 25' for the simulator valve 25 is provided in the valve side 30 of the hydraulic block 29 approximately in the horizontal center plane centrally between the top side 32 and the bottom side 34 of the hydraulic block 29 and between the sixth side 35 and the servo power cylinder bore 8'-in the exemplary embodiment somewhat closer to the sixth side 35 than to the servo power cylinder bore 8' in the hydraulic block 29.

A first brake fluid line 37 (FIG. 3) connects the brake master cylinder bore 8'-in the exemplary embodiment a primary chamber of the brake master cylinder bore 22' assigned to a first brake circuit I of the servo power brake system 1—to the receptacle 25' for the simulator valve 25. The first brake fluid line 37, originating from the mounting side 33 of the hydraulic block 29, extends parallel to the brake master cylinder bore 22' past the bottom of the servo power cylinder bore 8' up to an imaginary axial plane, parallel to the sixth side 35 of the hydraulic block 29, of the receptacle 25' for the simulator valve 25. In this imaginary axial plane, after a right-angled bend the first brake fluid line 37 extends onward as an oblique bore 38, as in FIG. 3, obliquely to the valve side 30 and to the motor side 31 and parallel to the sixth side 35 toward the receptacle 25' for the simulator valve 25, into which the oblique bore38 opens or, as in FIG. 4, with two bends with a brake fluid line 37 originating from the bottom side 34 and onward with a brake fluid line 37 from the motor side 31, both brake fluid lines being provided with the reference numeral 37, to the receptacle 25' for the simulator valve 25. From the first brake fluid line 37, a branch 39 opens parallel to, close to and outside the servo power cylinder bore 8' into the primary chamber of the brake master cylinder bore 22'. The branch 39 opens into the brake master cylinder bore 22' at a circumferential point facing the top side 32 of the hydraulic block 29 in such a way that the brake master cylinder bore 8' or the brake master cylinder 8 can be vented.

Figure 4:
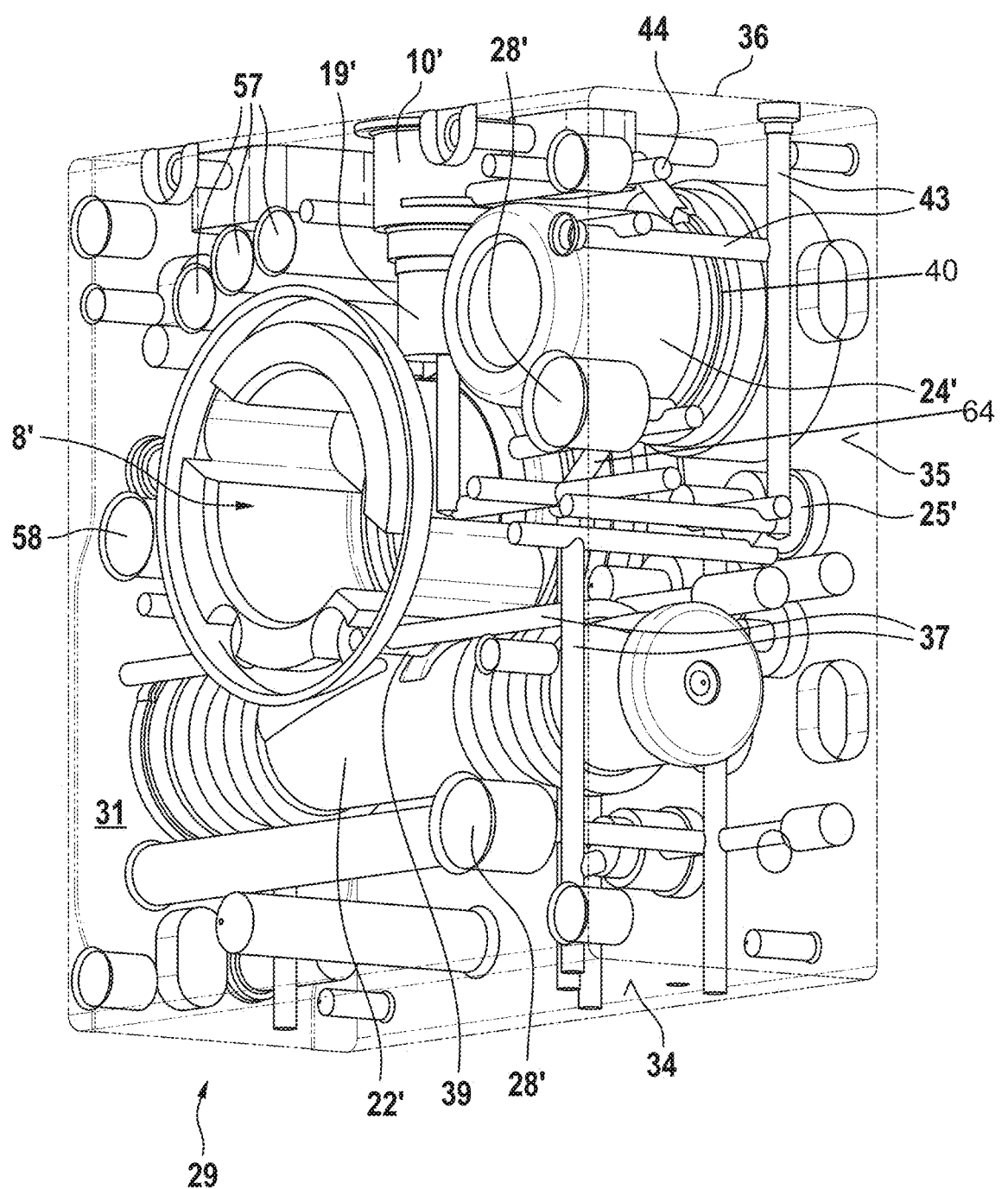
FIGS. 4 to 7 show bore arrangements according to the present invention of the hydraulic block from FIGS. 2 and 3.

A bore 41 connects one of the receptacles 23' for one of the two second isolation valves 23 to the brake master cylinder bore 22' (FIG. 2). The bore 41 leads tangentially at a circumferential point facing the top side 32 of the hydraulic block 29 into a groove 65 surrounding the brake master cylinder bore 22' close to the opening of the brake master cylinder bore 22' on the mounting side 33. The bore 41 is crossed by a second brake fluid line 42 which leads from the sixth side 35 of the hydraulic block 29 parallel to the brake master cylinder bore 22' to below the receptacle 25' for the simulator valve 25. From there, the second brake fluid line 42 extends after a bend upward to the receptacle 25' for the simulator valve 25 and after a further bend toward the valve side 30, where it opens axially parallel into the receptacle 25' for the simulator valve 25 (FIGS. 3 and 4). The second brake fluid line 42 leads through below the servo power cylinder bore 8' and extends obliquely above the brake master cylinder bore 22' in a tangential plane of the brake master cylinder bore 22' at the circumferential point of the brake master cylinder bore 22' facing the top side 32 of the hydraulic block 29 on a side of the brake master cylinder bore 22' facing the motor side 32 of the hydraulic block 29. Thanks to the connection of the brake master cylinder bore 22' at the circumferential point facing the top side 32, it is possible to vent the brake master cylinder bore 22' if the hydraulic block 29 is mounted, with the top side 32 upward, by its mounting side 35 for example on a bulkhead of a motor vehicle. This also applies in the case of an oblique bulkhead.

From the receptacle 25' for the simulator valve 25, a likewise multiply bent third brake fluid line 43 extends parallel to the sixth side 35 of the hydraulic block 29 upward and, after a bend, parallel to the simulator cylinder bore 24' on a side of the simulator cylinder bore 24' facing the sixth side 35 of the hydraulic block 29 toward the motor side 31 of the hydraulic block 29 (FIG. 4). A tap bore 44 connects the third brake fluid line 43 to the simulator cylinder bore 24'.

Figure 5:
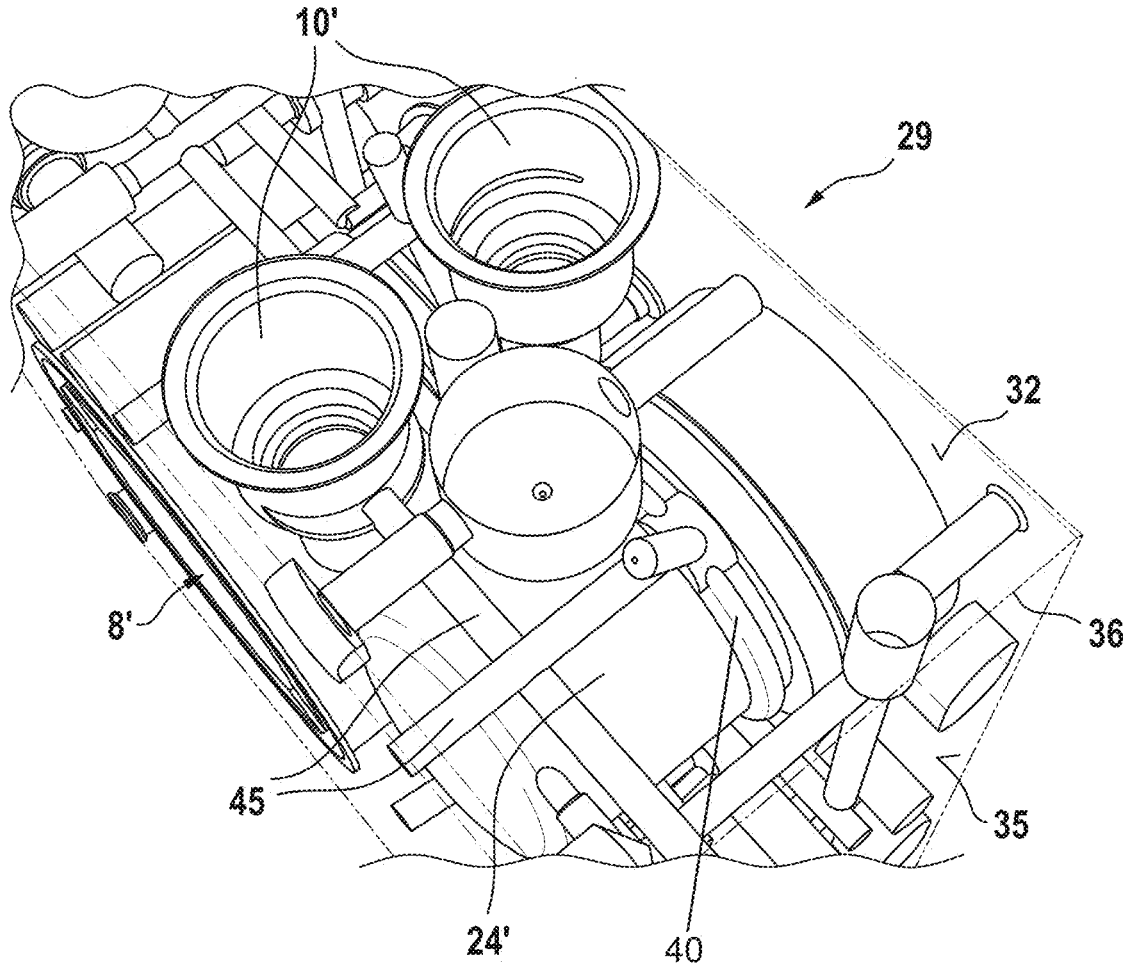

A bent fourth brake fluid line 45 leads in a plane parallel to the top side 32 of the hydraulic block 29 above the simulator cylinder bore 24' axially parallel to the simulator cylinder bore 24' toward the motor side 31 and, after a bend, onward to the port 10' for the brake fluid reservoir 10 in the top side 32 of the hydraulic block 10 which is closer to the motor side 31 (FIG. 5). The fourth brake fluid line 45 provides thermal relief for the servo power brake system 1, and hydraulic pressure can be released through it by opening the drain valve 9.

In the motor side 31 (FIG. 3), the hydraulic block 29 has two blind holes as ports 28' for the brake lines 28 leading to the pressure control module 27, which can be connected to the ports 28' with press-in nipples, screw nipples or in another manner (not shown). A first of the two ports 28' is offset obliquely downward from the simulator cylinder bore 24' toward the sixth side 35 of the hydraulic block 29 and a second of the two ports 28' is offset close to the closed end of the brake master cylinder bore 22' somewhat downward relative to the brake master cylinder bore 22' toward the bottom side 34 in the motor side 31 of the hydraulic block 29. The one port 28' is located above the brake master cylinder bore 22' and substantially closer to the simulator cylinder bore 24' than to the brake master cylinder bore 22'.

A multiply bent fifth brake fluid line 46 connects one of the two ports 28' for the brake lines 28 leading to the pressure control module 27 through one of the two second isolation valves 23 to the brake master cylinder bore 22' (FIG. 6): The fifth brake fluid line 46 extends from the receptacle 23' for one of the two second isolation valves 23 on the mounting side 33 upward past the servo power cylinder bore 8' then, after a bend, toward the sixth side 35 above the servo power cylinder bore 8' and, after a further bend, back downward in front of the simulator cylinder bore 24' on the side of the servo power cylinder bore 8' facing the sixth side 35. Then, after another bend, the fifth brake fluid line 46 below the simulator cylinder bore 24' extends through toward the sixth side 35 up to the port 28' for the pressure control module 27.

A bore 60 originating from the bottom side 34, which bore radially crosses a groove 61 surrounding the brake master cylinder bore 22', leads upward on the motor side 31 past the receptacle 11' for one of the two servo power valves 11. A bore 62 axial to the receptacle 11' connects the receptacle 11' to the bore 60 (FIG. 2). An oblique bore 63 in the receptacle 9' for the drain valve 9 and an oblique bore 64 in the simulator cylinder bore 24' open into the bore originating from the bottom side 34, whereby the servo power cylinder bore 8' is connected through the receptacle 9' for the drain valve 9 to the receptacle 11' for the servo power valve 11 and to the simulator cylinder bore 24'.

Figure 6:
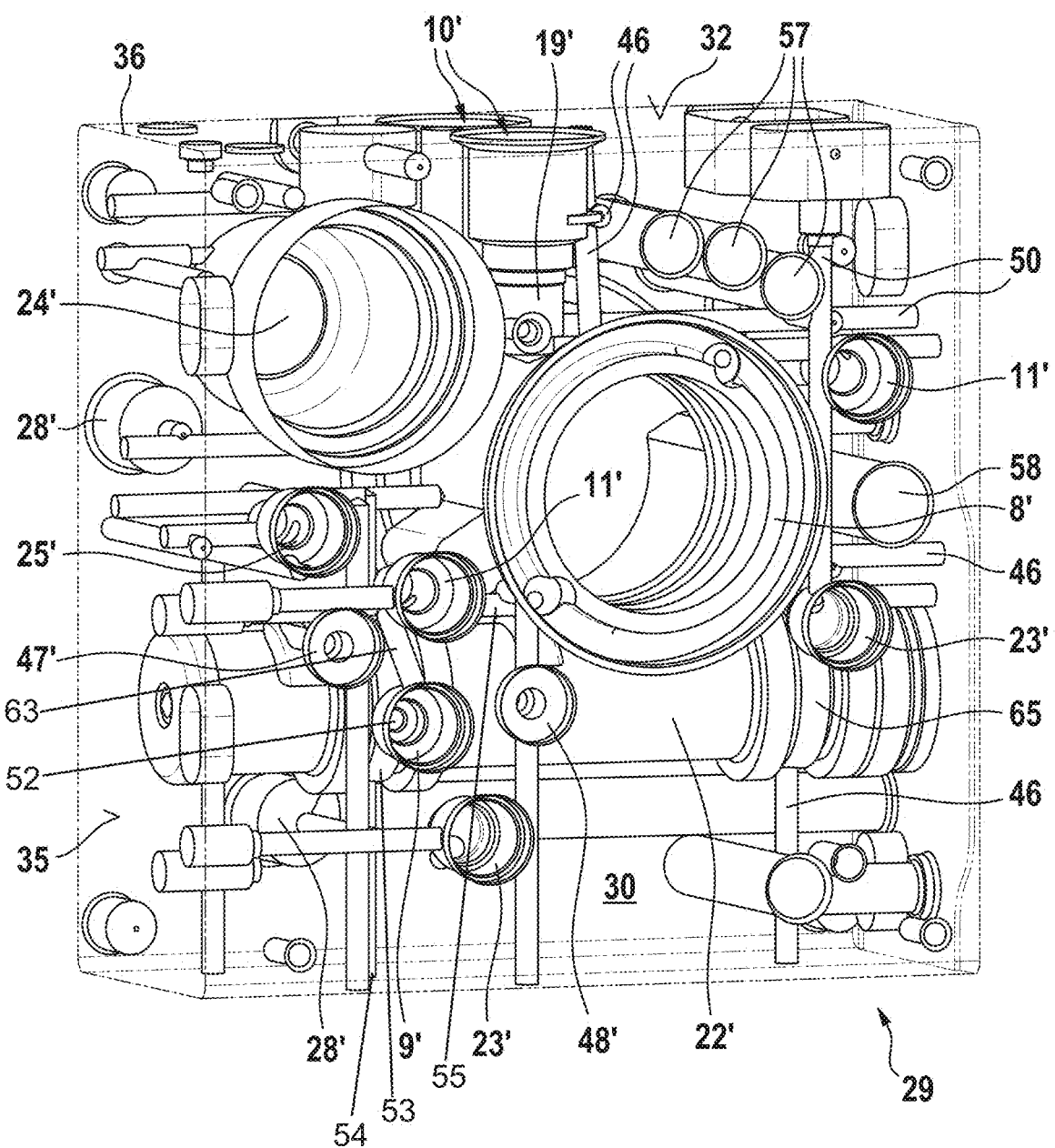

Receptacles 19' for the nonreturn valves 19 in the hydraulic block 29 are provided coaxially with the ports 10' for the brake fluid reservoir 10 at the bottom of the ports 10' (FIGS. 2 and 6). The receptacles 19' take the form of extensions of the ports 10' embodied as blind holes with a stepped diameter. From the receptacle 19' for the nonreturn valve 19, a sixth brake fluid line 50 leads parallel to the top side 32 of the hydraulic block 29 to the mounting side 33 and, after a bend, downward to one of the two receptacles 11' for the servo power valves 11.

Reference numeral 47' denotes a receptacle for a pressure sensor 47 connected to the brake master cylinder 22 and reference numeral 48' a receptacle for a pressure sensor 48 connected to the cylinder 8 of the servo power brake pressure generator 3 in the valve side 30 of the hydraulic block 29. From the bottom of the receptacle 47' for the pressure sensor 47, a bore 49 leads axially to the receptacle 47' into the brake master cylinder bore 22'. The bore 49 opens tangentially at a circumferential point facing the top side 32 of the hydraulic block 29 into the brake master cylinder bore 22'. A bent sixth brake fluid line 51 leads from the bore 49 downward to the bottom side 34 of the hydraulic block 29 and, after a bend originating from the sixth side 35, to the receptacle (23') for the second isolation valve 23 (FIG. 2).

Opposite the servo power cylinder bore 8', somewhat offset toward the opposite side 35, a receptacle 9' for the drain valve 9 and a receptacle 11' for one of the two servo power valves 11 are provided perpendicularly one above the other in the valve side 30 of the hydraulic block 29.

In order to connect the drain valve 9 to the brake fluid reservoir 10, a brake fluid line 52 (FIG. 5) leads from the bottom of the receptacle 9' for the drain valve 9 coaxially into a groove 53 (FIGS. 2 and 3) which surrounds the brake master cylinder bore 22', the brake fluid line 52 opening radially into the groove 53. From the bottom side 34 of the hydraulic block 29, a brake fluid line 54, which passes radially through the groove 53 surrounding the brake master cylinder bore 22', leads upward toward the top side 32 of the hydraulic block 29, opening into an oblique bore 55, to a groove 40 surrounding the simulator cylinder bore 24'. From the groove 40, at a circumferential point facing the mounting side 33 of the hydraulic block 29, a brake fluid line 44 leads upward to the top side 32 of the hydraulic block 29, which intersects a recess 45 which is open to the port 10' for the brake fluid reservoir 10 in the top side 32 of the hydraulic block 29 (FIG. 2). Through the groove 53, the receptacle 9' for the drain valve 9 also then communicates with the port 10' for the brake fluid reservoir 10, when a brake master cylinder piston (not shown) is located in the brake master cylinder bore 22 within the groove 38.

One configuration of the present invention provides a test valve (not shown in FIG. 1), which is hydraulically interposed between the brake fluid reservoir 10 and the brake master cylinder 22. A receptacle 66' for the test valve is arranged below the receptacle 23' for the one second isolation valve 23 in the valve side 30 of the hydraulic block 29. A bore 67 axially through the receptacle 66' for the test valve connects the receptacle to the brake master cylinder bore 22'. A bent seventh brake fluid line 68 which, originating from the mounting side 33, leads parallel to the brake master cylinder bore 22', opens, after a bend upward, into the servo power cylinder bore 8'. The receptacle 66' for the test valve and the bent seventh brake fluid line 68 are drawn with dashed lines in FIG. 2. In the configuration of the present invention including the test valve, the fifth brake fluid line 46 is omitted.

A position of receptacles 9', 11', 12', 14', 15', 20', 23', 25' for solenoid valves 9, 11, 12, 15, 20, 23, 25 and of receptacles 47', 48' for the two pressure sensors 47, 48 in the hydraulic block 29 for the hydraulic unit of the servo power brake system 1 can be inferred from the drawings.

The brake fluid lines are consecutively numbered for differentiation. Not all the brake fluid lines need be present.

What is claimed is:

1. A cuboidal hydraulic block for a hydraulic unit of a hydraulic servo power brake system, the hydraulic block having a top side, a bottom side opposite the top side, a mounting side adjacent the top side, a motor side adjacent the top side, the bottom side, and the mounting side, a valve side opposite the motor side, and a sixth side opposite the mounting side, and the hydraulic block has a port for a brake fluid reservoir in the top side, a brake master cylinder bore which opens on the mounting side, and a servo power cylinder bore which opens on the motor side;

wherein the brake master cylinder bore is arranged in the hydraulic block between the servo power cylinder bore and the bottom side;

wherein: (i) the hydraulic block has a port for a brake line leading to a pressure control module in the motor side close to the sixth side opposite the mounting side in a plane parallel to the top side of the hydraulic block and intersecting the servo power cylinder bore and/or (ii) the hydraulic block has a port for a brake line leading to the pressure control module in the motor side close to the sixth side opposite the mounting side and close to the brake master cylinder bore; and wherein the hydraulic block has a multiply bent fifth brake fluid line which passes through between the servo power cylinder bore and a simulator cylinder bore and passes via the servo power cylinder bore which connects the port for the brake line leading to the pressure control module to a receptacle for a second isolation valve.

2. The hydraulic block as recited in claim 1, wherein the simulator cylinder bore is arranged in an axial plane of the servo power cylinder bore through an edge of the hydraulic block between the top side and a sixth side of the hydraulic block opposite the mounting side.

3. The hydraulic block as recited in claim 2, wherein the hydraulic block has a receptacle for a simulator valve in the valve side, and wherein a first brake fluid line leads from the mounting side, parallel to the brake master cylinder bore, to an oblique bore which opens into the receptacle for the simulator valve, wherein a branch from the first brake fluid line opens into the brake master cylinder bore at a circumferential point of the brake master cylinder bore facing the top side of the hydraulic block.

4. The hydraulic block as recited in claim 3, wherein a bent third brake fluid line parallel to the sixth side opposite the mounting side between the receptacle for the simulator valve and the simulator cylinder bore on one side of the third brake fluid line and the sixth side on another side of the third brake fluid line connects the receptacle for the simulator valve to the simulator cylinder bore.

5. The hydraulic block as recited in claim 2, wherein the hydraulic block has a receptacle for a simulator valve in the valve side, and wherein a sixth brake fluid line, which passes radially through the brake master cylinder bore, leads from the bottom side of the hydraulic block to the simulator cylinder bore.

6. The hydraulic block as recited in claim 1, wherein the hydraulic block has two ports for the brake fluid reservoir side by side in the top side of the hydraulic block.

7. The hydraulic block as recited in claim 6, wherein, in a plane parallel to the top side of the hydraulic block, a bent fourth brake fluid line connects the simulator cylinder bore to one of the two ports for the brake fluid reservoir.

8. The hydraulic block as recited in claim 6, wherein the hydraulic block has a receptacle for a nonreturn valve at a bottom of the port for the brake fluid reservoir, and wherein a sixth brake fluid line, which is parallel to the top side of the hydraulic block, connects the receptacle for a servo power valve to the receptacle for the nonreturn valve.

9. The hydraulic block as recited in claim 6, wherein a sixth brake fluid line originating from the bottom side radially crosses the brake master cylinder bore and opens into a groove surrounding the servo power cylinder bore, from where the sixth brake fluid line extends further upward toward the top side of the hydraulic block and, after a bend, opens into one of the two ports for the brake fluid reservoir.

10. The hydraulic block as recited in claim 1, wherein a port for the brake fluid reservoir is arranged in the top side of the hydraulic block between the simulator cylinder bore and a motor power bore, which passes through the hydraulic block above the servo power cylinder bore from the motor side to the valve side.

11. The hydraulic block as recited in claim 1, wherein the hydraulic block has the receptacle for the second isolation valve and a receptacle for a pressure sensor in the valve side, wherein a bore connects the receptacle for the pressure sensor to the brake master cylinder bore, and wherein a multiply bent sixth brake fluid line connects the bore to the receptacle for the second isolation valve.

12. The hydraulic block as recited in claim 1, wherein the hydraulic block has a receptacle for a pressure sensor in the valve side, from which a brake fluid line leads to the brake master cylinder bore which opens into the brake master cylinder bore at a circumferential point facing the top side of the hydraulic block.

13. The hydraulic block as recited in claim 1, wherein the hydraulic block has a receptacle for a servo power valve in the valve side, wherein a sixth brake fluid line leads from the servo power cylinder bore to the receptacle for the servo power valve, wherein the hydraulic block has a port for a brake line leading to a pressure control module in the motor side, and wherein a brake fluid line connects the receptacle for the servo power valve to the port for the brake line leading to the pressure control module.

14. The hydraulic block as recited in claim 1, wherein the hydraulic block has a receptacle for a servo power valve and a receptacle for a drain valve in the valve side, and wherein an oblique bore leads from the servo power cylinder bore to a brake fluid line which connects the servo power cylinder bore to the receptacle for the servo power valve and to the receptacle for the drain valve.

15. The hydraulic block as recited in claim 1, wherein the hydraulic block has a receptacle for a test valve in the valve side, wherein a bore connects the receptacle for the test valve to the brake master cylinder bore, and wherein a bent seventh brake fluid line connects the bore to the servo power cylinder bore.

* * * * *